United States Patent
Sinclair et al.

(10) Patent No.: US 6,177,946 B1
(45) Date of Patent: Jan. 23, 2001

(54) METHOD AND APPARATUS FOR PROCESSING VIDEO DATA AND GRAPHICS DATA BY A GRAPHIC CONTROLLER

(75) Inventors: David Edward Sinclair, North York; Oswin Hall, Markham, both of (CA)

(73) Assignee: ATI Technologies, Inc., Unionville (CA)

(*) Notice: Under 35 U.S.C. 154(b), the term of this patent shall be extended for 0 days.

(21) Appl. No.: 08/970,458

(22) Filed: Nov. 14, 1997

(51) Int. Cl.[7] .............................. G06F 15/00; G09G 5/00
(52) U.S. Cl. .................... 345/501; 345/154; 345/509; 345/3; 345/5
(58) Field of Search .................................. 345/112, 115, 345/150, 154, 501–506, 520, 521, 507, 509, 512, 203, 1–5; 348/552

(56) References Cited

U.S. PATENT DOCUMENTS

| | | | |
|---|---|---|---|
| 5,097,257 | * 3/1992 | Clough et al. | 345/132 |
| 5,694,141 | * 12/1997 | Chee | 345/1 |
| 5,712,688 | * 1/1998 | Eglit | 348/510 |
| 5,754,170 | * 5/1998 | Ranganathan | 345/507 |
| 5,764,201 | * 6/1998 | Ranganathan | 345/3 |
| 5,784,050 | * 7/1998 | Corry | 345/154 |
| 5,808,630 | * 9/1998 | Pannell | 345/514 |
| 5,815,634 | * 9/1998 | Daum et al. | 386/96 |
| 5,877,741 | * 3/1999 | Chee et al. | 345/113 |
| 5,929,924 | * 7/1999 | Chen | 348/522 |
| 5,963,192 | * 10/1999 | Wong et al. | 345/150 |
| 5,977,960 | * 11/1999 | Nally et al. | 345/191 |
| 5,986,676 | * 11/1999 | Dwin et al. | 345/509 |

* cited by examiner

*Primary Examiner*—Ulka J. Chauhan
(74) *Attorney, Agent, or Firm*—Markison & Reckamp, P.C.

(57) ABSTRACT

A method and apparatus for processing video and graphics data is accomplished by receiving display data that includes at least one of video data and graphics data. If the display data includes video data, the video data is converted into graphics formatted video data when a first control signal is in a first state. The graphics formatted video data, which is now in a format consistent with the computer monitor (e.g., an RGB video format), is then provided to the computer monitor based on the enablement of the first control signal. Alternately, or in addition to, the graphics data may be provided to the computer monitor. If the display data includes graphics data, i.e., computer generated data for display on a computer monitor, the graphics data is converted into video formatted graphics data when a second control signal is in a second state. In this conversion, the graphics data, which is in a RGB format, is converted into a video format, e.g., a YUV data format. Having made the conversion, the video data and/or the video format graphics data is provided to a television based on the second control signal.

19 Claims, 5 Drawing Sheets

METHOD AND APPARATUS FOR PROCESSING VIDEO DATA AND GRAPHICS DATA BY A GRAPHIC CONTROLLER

TECHNICAL FIELD OF THE INVENTION

The present invention relates generally to video graphics processing and more particularly to processing video data and graphics data without redundant format conversions.

BACKGROUND OF THE INVENTION

Computers are known to include a central processing unit ("CPU"), video graphics processing circuitry, cache memory, floppy disk memory, hard drive memory, and peripheral input/output ports, which allow peripheral devices such as a CRT display (or monitor), printer, etc. to be coupled to the computer. In addition, some computers may include a television encoder, such that the computer can receive and display television signals. Such television signals include broadcast television, cable television, satellite television VCR (videocassette recorder) transmissions, and/or DVD video transmissions.

FIG. 1 illustrates a portion of such a computer system 10 that includes a graphic controller 12 and a TV encoder 14. The graphics controller 12 controls the processing of video information that is to be presented on the computer monitor 28, while the TV encoder 14 generates video outputs such as composite video 30, S video Y 32, and S video C 34 for display on a television. The graphics controller 12 includes video circuitry 16 and a digital to analog converter (DAC) 18. The video circuitry 16 receives video inputs 26 that are in the Y,Cb,Cr format and converts the input 26 into RGB (Red, Green, Blue) data, which may be 16 or 24 bits in length. The video circuit 16 may also scale the video inputs 26 prior to converting them to RGB data. The DAC 18 converts the digital 8 bit RGB data into analog signals such that they may be displayed on the monitor 28.

The TV encoder, upon receiving the eight bit RGB data, converts the data into YUV data via an RGB to YUV converter 20. The converted data is then scaled by a scaling circuit 22 and converted to an analog signal by the digital to analog converter 24. In such a system, the video input 26 is converted to a RGB graphics data format and then reconverted to a YUV video format. Such conversions reduce the video quality of video signals being presented at the video outputs 30, 32 and 34. In addition to the redundant format conversions, the circuit of FIG. 1 requires two circuits to process video data and graphics data. In laptop computer applications, the multiple circuit approach of FIG. 1 requires additional real estate, which adds to the overall size of the laptop computer.

Therefore, a need exists for a method and apparatus that integrates video data processing and graphics data processing without redundant format conversions.

DETAILED DESCRIPTION OF A PREFERRED EMBODIMENT

Generally, the present invention provides a method and apparatus for processing video and graphics data. This may generally be accomplished by receiving display data that includes at least one of video data and graphics data. If the display data includes video data, the video data is converted into graphics formatted video data when a first control signal is in a first state. For example, when video data, which includes television broadcasts, VCR video transmissions, DVD video transmissions, etc. is to be displayed on a computer screen, or monitor, the video data is converted into a graphics formatted video data. The graphics formatted video data, which is now in a format consistent with the computer monitor (e.g., an RGB video format), is then provided to the computer monitor based on the enablement of the first control signal. Alternately, or in addition to, the graphics data may be provided to the computer monitor.

If the display data includes graphics data, i.e., computer generated data for display on a computer monitor, the graphics data is converted into video formatted graphics data when a second control signal is in a second state. In this conversion, the graphics data, which is in a RGB format, is converted into a video format, e.g., a YUV data format. Having made the conversion, the video data and/or the video formatted graphics data is provided to a television based on the second control signal. With such a method and apparatus, video and graphics data may be processed by an integrated circuit without redundant conversions between video data formats and graphics data formats, thereby eliminated the video degradation that is a by-product of the conversions.

Figure 1:
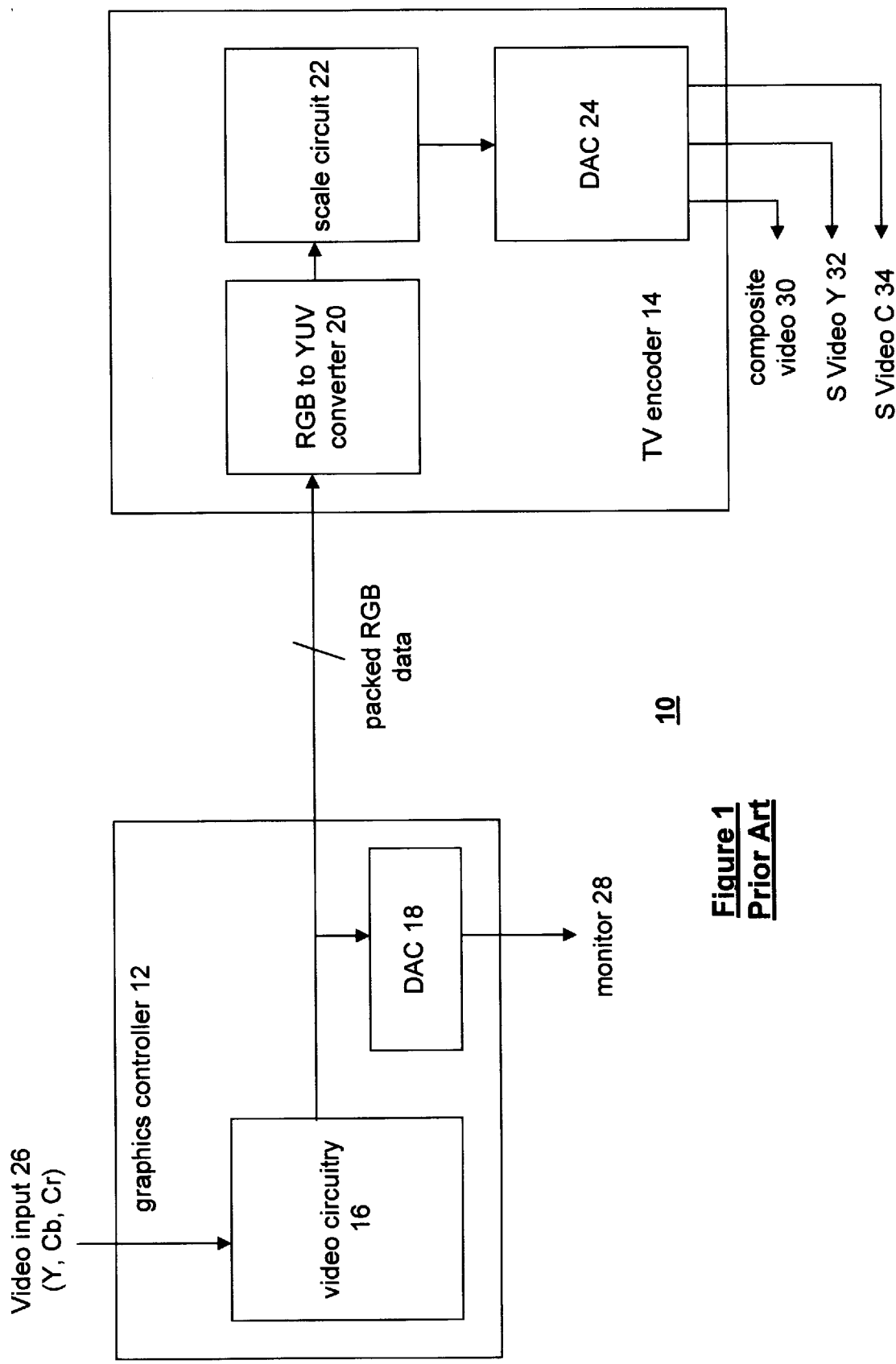
FIG. 1 illustrates a prior art schematic block diagram of a portion of a computer system.
Figure 2:
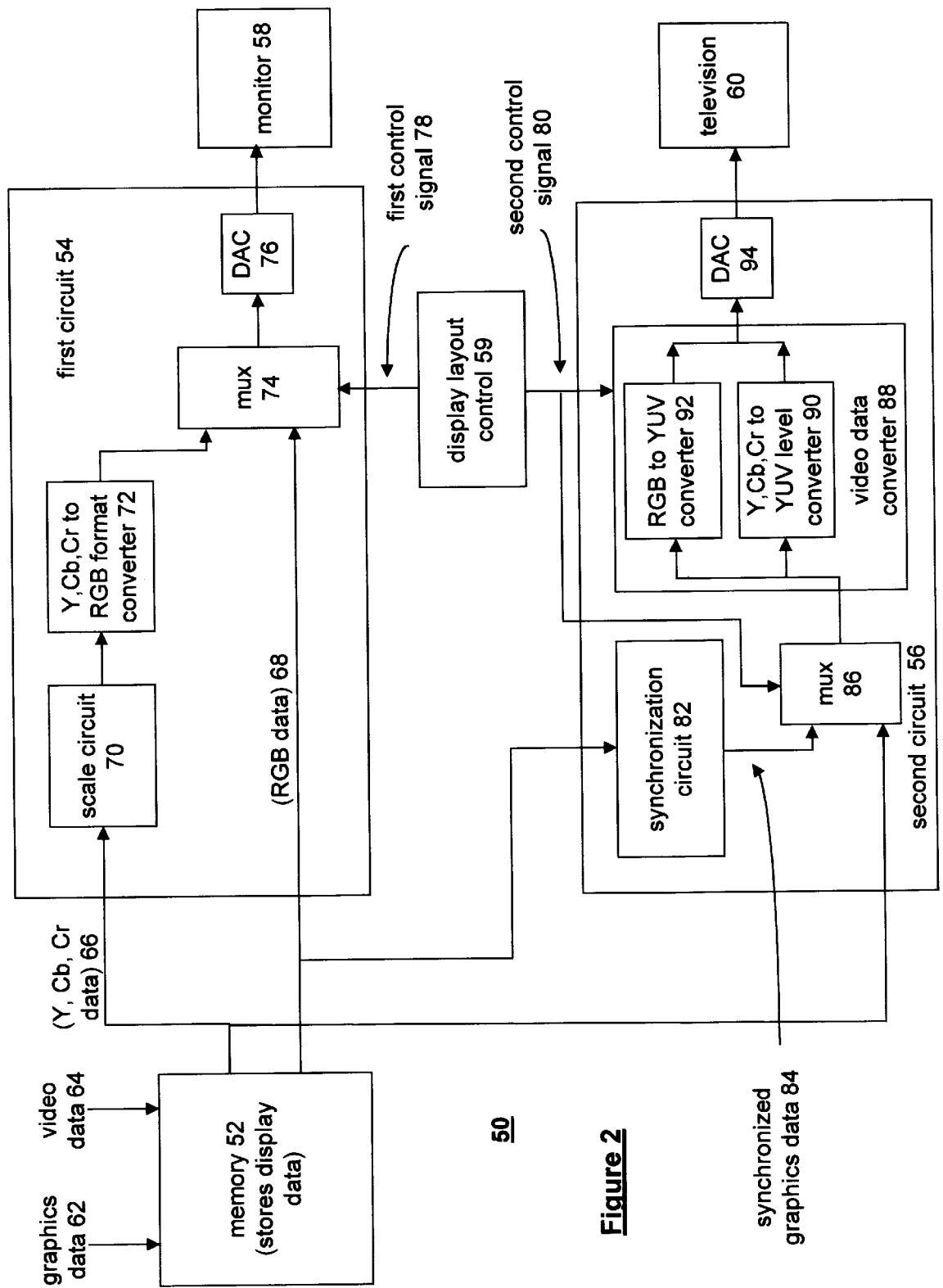
FIG. 2 illustrates a schematic block diagram of a video processing circuit in accordance with the present invention.

The present invention can be more fully described with reference to FIGS. 2 through 5. FIG. 2 illustrates a schematic block diagram of a video processing circuit 50 that includes memory 52, a first circuit 54, and a second circuit 56. The first circuit 54 provides video signals to a computer monitor 58 monitor (which may be a CRT (analog), or LCD (digital) monitor), while the second circuit 56 provides video signals to a television 60 (which may be a TV (analog), or HDTV (digital)). The memory 52, which may be a random access memory, floppy disk memory, hard drive memory, or any other device that stores and retrieves digital information, stores display data. Display data may be graphics data 62 and/or video data 64. Graphics data is data that is prepared by the video processing system to be displayed on a computer monitor 58. As such, graphics data 62 is generally in a graphics data format, such as a RGB video data format. Alternatively, the video data 64 is processed for display on a television set 60. As such, the video data 64 is either in a Y,Cb,Cr, video data format, or a YUV video data format.

In either case, graphics data 62 is not readily displayable on the television set 60 and video data is not readily displayable on the computer monitor 58.

The first circuit 64 includes a scaling circuit 70, a format conversion circuit 72, a multiplexor 74, and a digital to analog converter (DAC) 76. The scaling circuit 70 receives Y,Cb,Cr data 66 and scales it to the display size of the computer monitor 58.

Typically, the Y,Cb,Cr data 66 includes pixel information to fill a television screen, which may be 720×480 pixels. The scaling circuit converts the pixel information of a 720×480 screen to the display area of a computer screen, which for a full computer screen is 640×480 pixels. Note that the display area on a computer screen may be the full computer display screen, i.e., the 640×480 pixels, or may be any portion thereof which has been created by a window. The scaled Y,Cb,Cr data is then format converted into a graphics formatted video data. Typically, this conversion will entail converting the Y,Cb,Cr data into RGB video data. The converted RGB data is then provided to multiplexor 74 as one of its inputs. The other input of multiplexor 74 is the RGB data 68 that is stored in memory 52.

The multiplexor 74 outputs either the graphics formatted video data, i.e., the output of format converter 72, or the RGB data 68 based on a first control signal 78. The first control signal 78 is generated by a display layout controller circuit 59. The display layout controller 59 generates the first control signal 78 based on input responses received by the computer user. For example, if the computer user desires to display the graphics data 62, which has been stored in memory 52 as the RGB data 68, the display layout controller 59 generates a first control signal 78 such that the multiplexor 74 passes the RGB data 68 to the DAC 76. Alternatively, if the user desires to display the video data 64 on the computer screen, the display layout controller 59 generates the first control signal 78 such that multiplexor 74 passes the graphics formatted video data to the DAC 76.

As yet another alternative, the user may select to present both the video data and graphics data on the computer monitor 58. In this case, the graphics data 68 could be the background information, while the video data is placed in a window on the monitor 58, or vice versa. In this alternative, when the data has been retrieved from memory 52, the first control signal will be set such that the multiplexor 74 passes the graphics formatted video data when the window is being processed and passes the RGB data 68 when the background is being processed. As one skilled in the art will readily appreciate, by having the video data in a graphics format, the computer 10 may present any combination of the graphics formatted video data and the graphics data stored in the memory 52.

Whichever data is passed from multiplexor 74 to digital to analog converter 76, the digital to analog converter 76 converts the digital video signals into analog video signals such that they may be presented on monitors 58. Such a digital to analog conversion provides the monitor with analog representations of the graphics data and/or the graphics formatted video data at the appropriate pixel locations to achieve the desired display affect.

The second circuit 56 includes a synchronization circuit 82, a multiplexor 86, a video data converter 88, and a digital to analog converter 94. The synchronization circuit 82 is coupled to receive RGB data 68 from memory 52. The synchronization circuit 82 essentially forms a pipeline of RGB data, which is provided to multiplexor 86 such that the pipelining is done to synchronize the inputting of data to the multiplexor 86. The other input of multiplexor 86 is the video data output of memory 52. Note that the video data 64 may be YUV data and/or Y,Cb,Cr data 66. Further note that the Y,Cb,Cr data may be scaled prior to being inputted to the multiplexor 86. The multiplexor 86 outputs either the synchronized graphics data 84 or the Y,Cb,Cr data based on a second control signal 80. If the second control 80 causes multiplexor 86 to pass the RGB data 68 to the video data converter 88, the video data converter 88 converts the RGB data to either YUV data, or Y,Cb,Cr data. The format converter 92 performs such a conversion. If the format converter 92 converts the data to Y,Cb,Cr data, the data may again be converted to YUV data via a level converter 90. Note that when converting from Y,Cb,Cr data to YUV data there is no loss of video information, only the levels are adjusted. Thus, there is no degradation in video quality. Having made the conversion, the output of converter 92 is provided to the digital to analog converter 94, which converts the digital information to analog information such that it may be displayed on the television 60.

If the second control signal 80 causes the multiplexor 86 to pass the Y,Cb,Cr data to the video data converter 88, the video data converter level shifts the received data. The level shifting is done by level converter 90 wherein the output is provided to the digital to analog converter 94. Note that the first circuit 54 may process a first portion of the video data for display on the monitor and the second circuit may process a second portion of the video data for display on a television 60. As such video data may be presented on both screens, i.e., the monitor 58 and the television 60 simultaneously or in portions thereof. For example, if the video data is DVD data, which includes, sub pictures and video content, the sub pictures may be provided to the monitor, while the video content is provided to the television. As an alternative, the output of the scaling circuit 70 could be provided to a sync/convert circuit that converts the Y,Cb,Cr data to YUV data. In addition, the sync/convert circuit provides the YUV data in a pipelined manner to the multiplexor 86. If the second control signal 80 causes the multiplexor 86 to select the YUV data, the video data converter 88 passes the YUV data without conversion. With such a method and apparatus, a single integrated circuit may be produced to process video data and graphics data without unnecessary video format conversions that reduce video quality. As such, video quality is enhanced and the circuit complexity and overall size is reduced.

Figure 3:
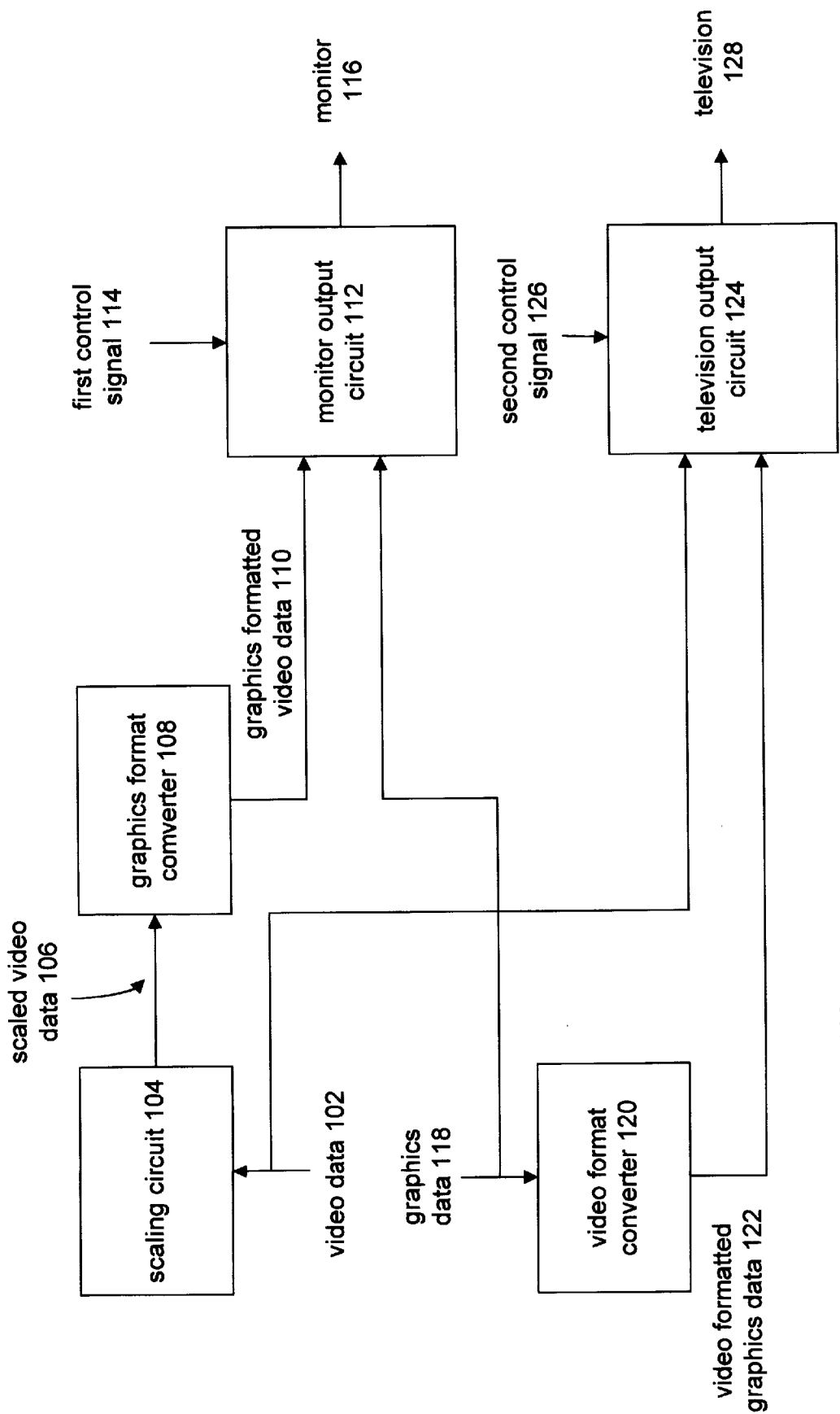
FIG. 3 illustrates a schematic block diagram of an alternate video graphics processing circuit in accordance with the present invention.

FIG. 3 illustrates a schematic block diagram of an alternate video processing system 100. The video processing system 100 includes a scaling circuit 104, a graphics format converter 108, a monitor output circuit 112, a video format converter 120, and a television output circuit 124. The scaling circuit 104 receives video data 102 and scales it to produce scaled video data 106. As previously mentioned, the scaling of video data may be scaling the video data up to accommodate a larger screen or scaling it down to accommodate a smaller screen or portion thereof. Typical scaling techniques include repeating pixel information to cover more pixels when scaling up or, when scaling down, the pixel information at multiple pixel locations is blended into pixel information for a single pixel location.

The scaled video data 106 is provided to the graphics format converter 108, which converts it into graphic formatted video data 110. Typically, the scaled video data will be in a YIUJV or Y,Cb,Cr format and when it is converted it will be in an RGB format. The graphics formatted video data 1 10 is provided as an input to the monitor output circuit 112. The monitor output circuit 112 outputs the graphics formatted video data 110 or graphics data 118, based on the status of the first control signal 114, to a monitor 116. Note that the monitor output circuit 112 may output both the graphics formatted video data 110 and the graphics data 118 in distinct portions of the monitor 116.

The video format converter 120 received graphics data 118, which it converts into video formatted graphics data 122. Recall that graphics data 118 may be in an RGB format and is converted to a YUV format. The video formatted graphics data 122 is provided as an input to the television output circuit 124. Alternatively, the television output circuit 124 could receive the scaled video signal 106 as an input.

The other input of the television output circuit 124 is the video data 102. Based on the status of the second control signal 126, the television output circuit 122 provides the video data 102 and/or the video formatted graphics data 122 to a television 128.

Figure 4:
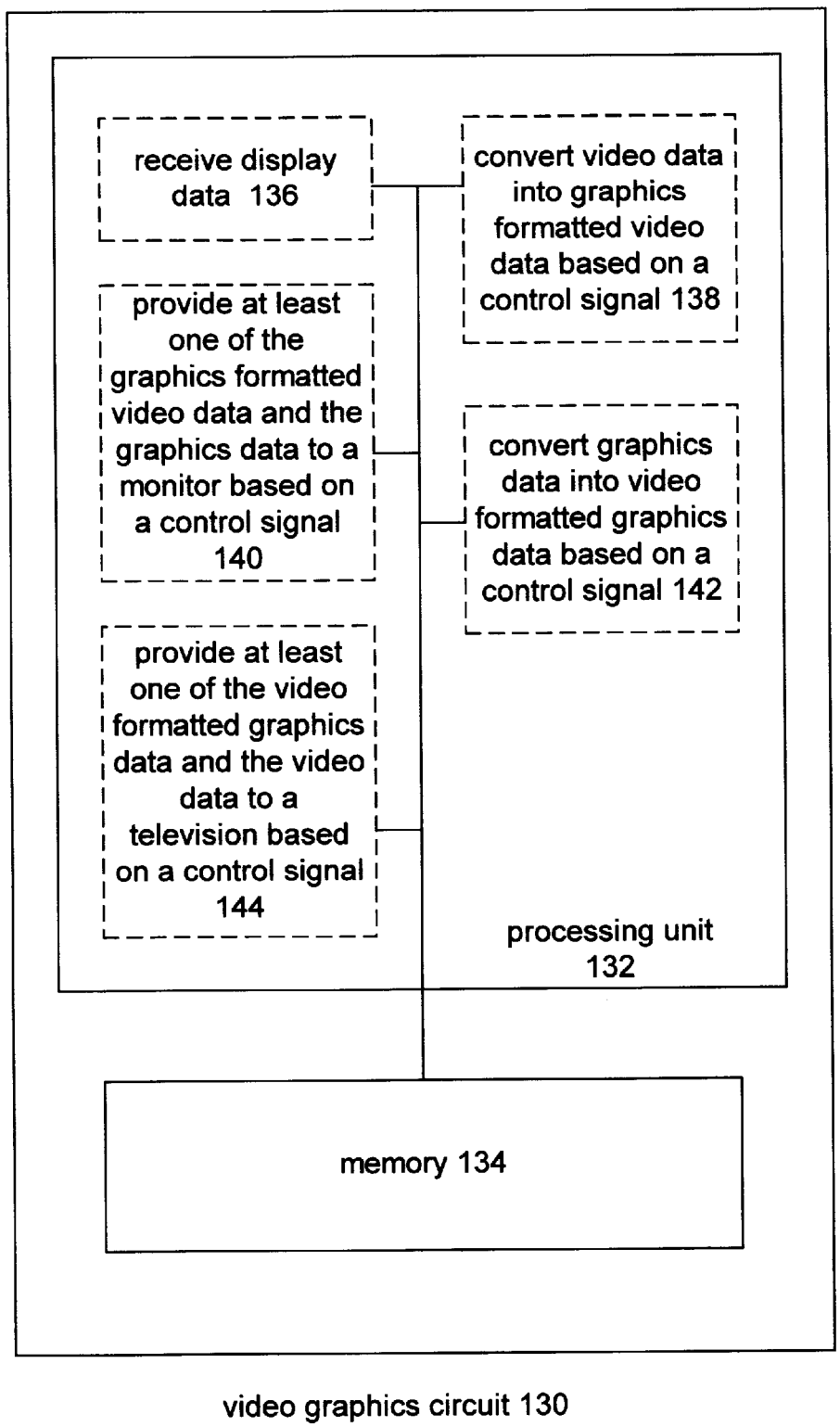
FIG. 4 illustrates a schematic block diagram of yet another video graphics processing circuit in accordance with the present invention.

FIG. 4 illustrates a schematic block diagram of yet another video graphic processing circuit 130. The video graphics processing circuit 130 includes a processing unit 132 and memory 134. The processing unit 132 may be a microprocessor, a microcomputer, a digital signal processor, a central processing unit, or any other device that manipulates digital information based on programming instructions. The memory 134 may be a read-only memory, a random access memory, a magnetic tape memory, a floppy disk memory, a hard disk memory, a DVD ROM, or any other device that stores digital information that subsequently may be retrieved.

The memory 134 stores programniing instructions that, when read by the processing units 132, causes the processing unit to function as a plurality of circuits 136–144. When executing the programming instructions, the processing unit 132 first functions as a circuit 136 to receive display data. The display data may be graphics data (graphics data formatted in a RGB format) and/or video data (i.e., data formatted based on YUV or Y,Cb,Cr format). Next, the processing unit 132 functions as a circuit 138 to convert video data into graphics formatted video data based on a control signal. Having made such a conversion, the processing unit 132 then functions as a circuit 140 to provided at least one of the graphics formatted video data and the graphics data to a monitor based on the control signal.

The processing unit 132 then functions as a circuit 142 which converts graphics data into video formatted graphics data based on a control signal. Having done this, the processing unit then functions as a circuit 144 to provide at least one of the video formatted graphics data and the video data to a television based on the control signal. Note that if the display data only includes the video data, the processing unit 132 will only function as circuits 138 and 140. Alternatively, note that if the display data only includes graphic data, the processing unit 132 will only function as circuits 142 and 144. The functionality of the processing unit 132 while performing the programming instructions stored in memory 134 may be more fully described with reference to FIG. 5.

Figure 5:
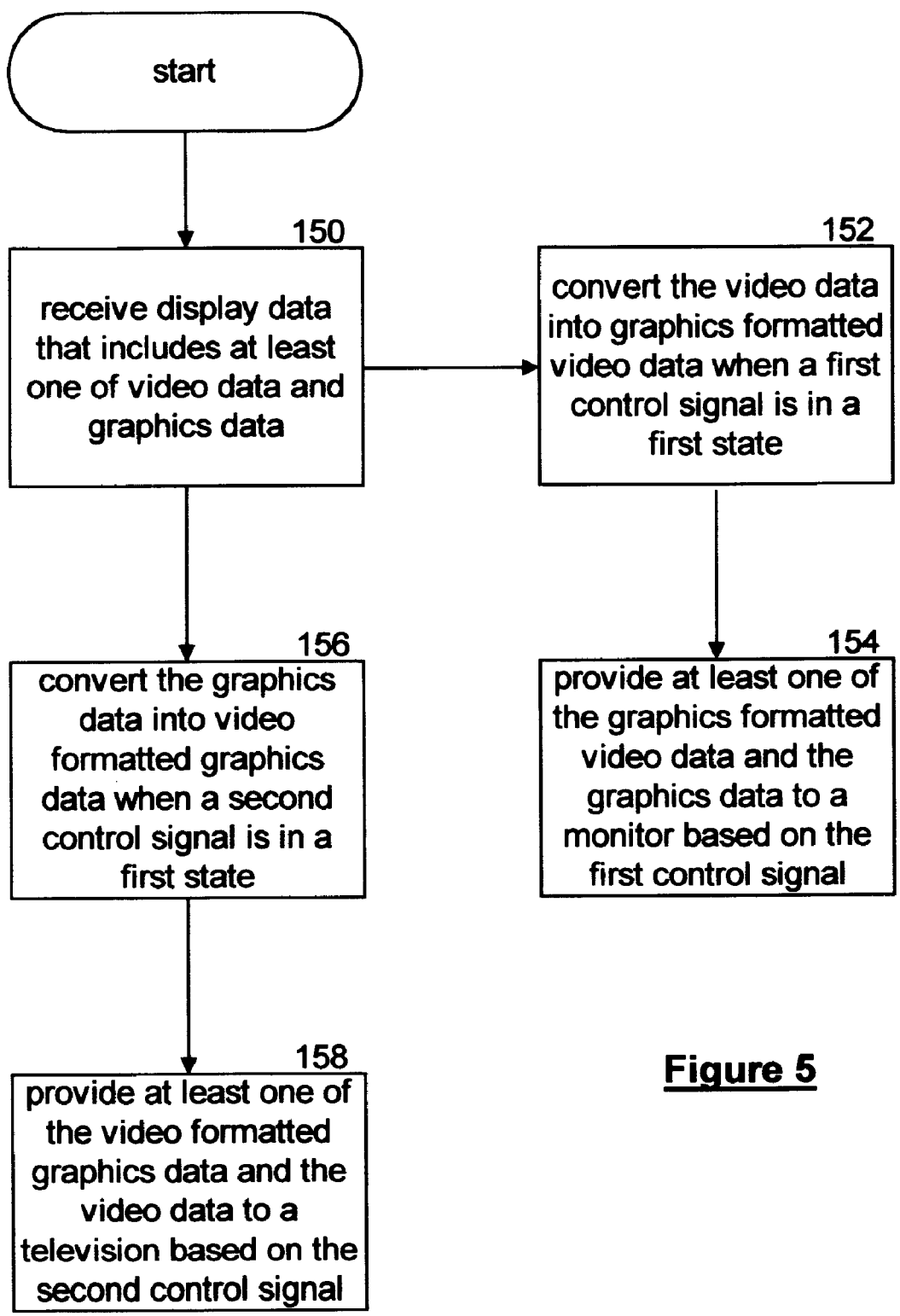
FIG. 5 illustrates a logic diagram of a method for processing video and graphics data in accordance with the present invention.

FIG. 5 illustrates a logic diagram of a method for processing video data and graphics data. The process begins at step 150 where display data is received. The display data includes at least one of video data and graphics data. The process then proceeds to step 152 or step 156. At step 152, the video data, if included in the display data, is converted into graphics formatted video data when a first control signal is in a first state. Such a format conversion may be done by converting Y,Cb,Cr video data into RGB graphics data. The process then proceeds to step 154 where at least one of the graphics formatted video data and the graphics data is provided to a monitor based on the first control signal. As previously discussed, if both the video data and graphics data are to be displayed, the control signal will select which one is to be displayed at which pixel locations on the monitor. Note that before step 152 is executed, the process may include the step of scaling the video data to produce scaled video data, wherein the scaling may be from full display video data to non-full display video data, from non-full display video data to full display video data, or from non-full display video data to non-full display video data.

At step 156, the graphics data, if included in the display data, is converted into video formatted graphics data when a second control signal is in a first state. Having converted the graphics data into video formatted graphics data, the process proceeds to step 158. At step 158 at least one of the video formatted graphics data and the video data is provided to a television set based on the second control signal.

The preceding discussion has described a method and apparatus for integrating processing of video data and graphics data without redundant format conversions. Such format conversions cause degradation and video quality. Thus by eliminating such conversions, the video quality of such a circuit is enhanced. In addition, by integrating the video data circuitry and graphics circuitry, the present invention is well-suited for laptop applications.

What is claimed is:

1. A video graphics circuit comprises:
   memory for storing display data, wherein the display data includes at least one of video data and graphics data;
   first circuit operably coupled to provide at least a portion of the display data to a monitor based on a first control signal, wherein, when the first control signal is in a first state, the first circuit converts the video data into graphics formatted video data and provides the graphics formatted video data to the monitor, and wherein, when the first control signal is in a second state, the first circuit passes the graphics data to the monitor; and
   second circuit operably coupled to provide at least a portion of the display data to a television based on a second control signal, wherein, when the second control signal is in a first state, the second circuit converts the graphics data into video formatted graphics data and provides the video formatted graphics data to the television, and wherein, when the second control signal is in a second state, the second circuit passes the video data to the television.

2. The video graphics circuit of claim 1 further comprises the video data being at least one of YUV data and YCbCr data and the graphics data being RGB data.

3. The video graphics circuit of claim 1 further comprises, within the first circuit,
   a first format converter operably coupled to receive the video data and to convert the video data into the graphics formatted video data; and
   a multiplexor operably coupled to receive the graphics formatted video data, the graphics data, and the first control signal, wherein the multiplexor outputs the graphics formatted video data when the first control signal is in the first state and outputs the graphics data when the first control signal is in the second state.

4. The video graphics circuit of claim 3 further comprises a scaler operably coupled to the memory and the first format converter, wherein the scaler scales the video data prior to being converted into the graphics formatted video data.

5. The video graphics circuit of claim 3 further comprises a digital to analog converter such that the monitor is provided with an analog representation of the graphics data and the graphics formatted video data.

6. The video graphics circuit of claim 1 further comprises, within the second circuit,
   a synchronization circuit operably coupled to receive the graphics data and to produce synchronized graphics data therefrom;
   a multiplexor operably coupled to receive the synchronized graphics data, the video data, and the second control signal, wherein the multiplexor outputs the synchronized graphics data when the second control signal is in the first state and outputs the video data when the second control signal is in the second state; and a video data converter operably coupled to receive the output from the multiplexor and the second control signal, wherein the video data converter converts the synchronized graphics data into the video formatted graphics data when the control signal is in the first state, and wherein the video data converter passes the video data when the control signal is in the second state.

7. The video graphics circuit of claim 6 further comprises, within the video data converter, a level converter that converts the video data from YCbCr data to YUV data.

8. The video graphics circuit of claim 6 further comprises a digital to analog converter such that the television is provided with an analog representation of the video data and the video formatted graphics data.

9. The video graphics circuit of claim 1 further comprises the first circuit processing a first portion of the video data for display on the monitor and the second circuit processing a second portion of the video data for display on the television.

10. A video graphics circuit comprises:
  a scaling circuit operably coupled to receive video data and scale the video data, wherein the video data is scaled from full display video data to non-full display video data, from the non-full display video data to the full display video data, or from the non-full display video data to the non-full display video data;
  graphics format converter operably coupled to receive the video data and to produce therefrom graphics formatted video data;
  video format converter operably coupled to receive graphics data and to produce therefrom video formatted graphics data;
  monitor output circuit operably coupled to provide the graphics formatted video data to a monitor when a first control signal is in a first state and to provide the graphics data to the monitor when the first control signal is in a second state; and
  television output circuit operably coupled to provide the video formatted graphics data to a television when a second control signal is in a first state and to provide at least a portion of the video data to the television when the second control signal is in a second state.

11. The video graphics circuit of claim 10 further comprises, within the scaling circuit, a de-interlacing circuit that de-interlaces the video data.

12. The video graphics circuit of claim 10 further comprises, within the video format converter, a level converter that converts a level of the video data to produced level adjusted video data.

13. The video graphics circuit of claim 12 further comprises the video data being YCbCr data and the level adjusted video data being YUV data.

14. A method for processing video data, the method comprises the steps of:

a) receiving display data, wherein the display data includes at least one of video data and graphics data;
b) converting the video data into graphics formatted video data when a first control signal is in a first state;
c) providing at least one of the graphics formatted video data and the graphics data to a monitor based on the first control signal;
d) converting the graphics data into video formatted graphics data when a second control signal is in a second state; and
e) providing at least one of the video data and the video formatted graphics data to a television based on the second control signal.

15. The method of claim 14 further comprises, within step (b), converting the video graphics data, which is in an YCbCr data format, into the graphics formatted video data, which is an RGB data format.

16. The method of claim 14 further comprises, prior to the converting the video data into the graphics formatted video data, scaling the video data to produced scaled video data, wherein the video data is scaled from full display video data to non-full display video data or from the non-full display video data to the full display video data.

17. A video graphics processing circuit comprises:
  a processing unit; and
  memory that stores programming instructions that, when read by the processing unit, causes the processing unit to (a) receive display data, wherein the display data includes at least one of video data and graphics data; (b) convert the video data into graphics formatted video data when a first control signal is in a first state; (c) provide at least one of the graphics formatted video data and the graphics data to a monitor based on the first control signal; (d) convert the graphics data into video formatted graphics data when a second control signal is in a second state; and (e) provide at least one of the video data and the video formatted graphics data to a television based on the second control signal.

18. The video graphics processing circuit of claim 17 further comprises, within the memory, programming instructions that, when read by the processing unit, causes the processing unit to convert the video graphics data, which is in an YCbCr data format, into the graphics formatted video data, which is an RGB data format.

19. The video graphics processing circuit of claim 17 further comprises, within the memory, programming instructions that, when read by the processing unit, causes the processing unit to, prior to the converting the video data into the graphics formatted video data, scale the video data to produced scaled video data, wherein the video data is scaled from full display video data to non-full display video data or from the non-full display video data to the full display video data.

* * * * *